United States Patent Office 3,497,559
Patented Feb. 24, 1970

---

3,497,559
α-DI-LOWER ALKYLAMINOMETHYL-ORTHO-LOWER ALKOXYMETHYL-BENZYL ALCOHOLS
Francis J. Petracek, Agoura, Calif., assignor to Dart Industries Inc., a corporation of Delaware
No Drawing. Continuation-in-part of application Ser. No. 502,425, Oct. 22, 1965. This application Mar. 28, 1968, Ser. No. 717,008
Int. Cl. C07c 93/02
U.S. Cl. 260—570.6  3 Claims

ABSTRACT OF THE DISCLOSURE

α-Di-lower alkylamino-lower alkyl-o-lower alkoxymethyl benzyl alcohols such as α-dimehylaminomethyl-o-propoxymethylbenzyl alcohol which are useful as central nervous system depressants.

---

This application is a continuation-in-part of my application entitled "Substituted Benzyl Alcohols," Ser. No. 502,425, filed Oct. 22, 1965 and now abandoned.

This invention relates to compositions of matter classified in the art of chemistry as substituted benzyl alcohols.

The invention sought to be patented is described as residing in the concept of a chemical compound having a molecular structure in which there is attached to the α-carbon of a benzyl alcohol nucleus a di-lower alklamino-lower alkyl group and at the ortho-position a lower alkoxymethyl group, and the hereinafter disclosed equivalents thereof.

As used throughout this application, the terms "lower alkyl" and "lower alkylene" embrace both straight and branched chain alkyl and alkylene radicals, respectively, containing 1 to 6 carbon atoms, for example methyl, ethyl, propyl, isopropyl, n-butyl, tert-butyl, n-amyl, sec-amyl, n-hexyl, 2-ethylbutyl, 2,3-dimethylbutyl and the like; the term "lower alkoxy" embraces both straight and branched chain alkoxy radicals containing 1 to 6 carbon atoms, for example methoxy, ethoxy, propoxy, isopropoxy, n-butoxy, tert-butoxy, n-amoxy, sec-amoxy, n-hexyloxy, 2-ethylbutoxy, 2,3-dimethylbutoxy and the like; the term "lower alkanol" embraces both straight and branched chain alkanol radicals containing 1 to 6 carbon atoms, for example methanol, ethanol, n-propanol, isopropanol, n-butanol, tert-butanol, n-pentanol, sec-pentanol, n-hexanol, 2-ethylhexanol, 2,3-dimethylhexanol and the like; and the term "halo" embraces chloro, bromo, fluoro and iodo.

The tangible embodiments of this invention possess the inherent general physical characteristics of being liquids in the form of their free bases, and solid crystalline materials in the form of their acid-addition salts. Nuclear Magnetic Resonance (NMR) data, infra-red spectral data, ultraviolet spectral data and elemental analyses, taken together with the aforementioned physical properties, the nature of the starting materials and the mode of synthesis, positively confirm the structure of the compounds sought to be patented.

The tangible embodiments of this invention possess the inherent applied use characteristics of having significant pharmacological activity without demonstrable adverse toxicity as central nervous system depressants as determined by recognized and accepted pharmacological test procedures. For example, the compound α-dimethylaminomethyl-o-propoxymethyl benzyl alcohol has been found, according to the method of P. B. Dews, Brit. J. Pharmacol 8:46 (1953), to decrease spontaneous locomotor activity in mice. It has also been found, according to the method of Lasagna and McCann, Science 125:1241 (1957), to provide protection against amphetamine toxicity in mice that is equivalent to or greater than that provided in the same tests by such well-known central nervous system depressants as meprobamate, diazepam and chlorpromazine. In addition it has been found to prolong the sleeping time of animals pretreated with sodium hexobarbital.

The manner and process of making and using the invention will now be generally described so as to enable a person skilled in the art of chemistry to make and use the same as follows:

The reaction sequence, leading to the substituted benzyl alcohols of this invention, is set forth as follows:

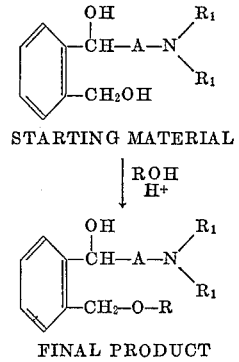

STARTING MATERIAL

↓ ROH
  H⁺

FINAL PRODUCT wherein R and $R_1$ are lower alkyl.

The substituted o-xylene-α,α'-diol starting materials depicted in the above reaction sequence are known compounds that are described, together with a method for their preparation, in U.S. Patent 3,284,468.

Conversion of the substituted o-xylene-α,α'-diol starting materials to the tangible embodiments of this invention is carried out by treating the starting material with an appropriate lower alkanol in the presence of a mineral cid, for example hydrochloric acid, and at the reflux temperature of the alkanol used. The liquid product is then recovered and isolated by means of distillation.

Starting materials in which the di-lower alkylamino portion of the di-lower alkylamino-lower alkyl radical is replaced by an amino or mono-lower alkylamino radical or by a heterocyclic ring linked to the lower alkyl group attached to the α-carbon atom of the nucleus through a nitrogen atom, such as piperidino, pyrrolidino, morpholino, piperazino and the like and/or starting materials having one or more lower alkyl, lower alkoxy, trifluoromethyl or halo radicals on the benzene ring are prepared as described in the aforementioned U.S. Patent 3,284,468 and such starting materials are the full equivalents in the above-described reaction sequence to the specific starting materials therein described, their use yielding correspondingly substituted benzyl alcohols which have the same utility as the specific substituted benzyl alcohols described above.

The tangible embodiments of this invention can, if desired, be converted into their non-toxic pharmaceutically acceptable acid-addition and quaternary ammonium salts. Salts which may be formed comprise, for example, salts with inorganic acids, such as the hydrochloride, hydrobromide, hydroiodide, sulfate, phosphate or the like. They may also comprise salts with organic acids, including monobasic acids such as the acetate or the propionate, and especially those with hydroxy acids, and polybasic acids, such as citrate, tartrate, malate and maleate. Pharmaceutically, the salt will not be substantially more toxic than the compound itself and, to be acceptable, it should be able to be incorporated into conventional liquid or solid pharmaceutical media. Among the useful quaternary ammonium salts are those formed by such alkyl halides as methyl iodide, n-hexyl bromide and the like. Such pharmaceutically useful acid-addition and quaternary ammonium salts are the full equivalents of the bases from which they are derived and are included within the scope of this invention.

The tangible embodiments of this invention, either as free bases or in the form of a non-toxic pharmaceutically acceptable acid-addition or quaternary ammonium salt, can be combined with conventional pharmaceutical diluents and carriers to form such dosage forms as tablets, suspension, solutions, suppositories and the like.

The individual unit dosage and frequence of administration of the compounds according to the present invention will be determined in part by the nature and severity of the condition for which a central nervous system depressant exhibiting pharmacological activity of the nature hereinafter described is indicated. It will also depend upon such factors as age, weight, species, underlying physical condition and selected route of administration. The exact amount to be administered should be non-toxic, yet pharmaceutically effective in providing the degree of central nervous system depression desired.

The best mode contemplated by the inventor for carrying out the invention will now be set forth as follows:

EXAMPLE 1

α-Dimethylaminomethyl-o-propoxymethyl benzyl alcohol

α-Dimethylaminomethyl-o-xylene-α,α'-diol hydrochloride (200 g., 0.86 mole) is dissolved in n-propanol (2000 ml.) and hydrogen chloride gas passed through the solution to about pH 1.0. The reaction mixture is then refluxed for 20 hours. The crude hydrochloride product is converted to the free base and distilled to yield 145 g. (71.4%) of an oily product, B.P. 125°–130° C. at 0.5 mm. Hg.

*Analysis.*—Calculated for $C_{14}H_{23}NO_2$: C, 70.85%; H, 9.77%; N, 5.90%; O, 13.48%. Found: C, 70.65%; H, 9.46%; N, 6.10%; O, 13.22%.

Pharmacological evaluation of α-dimethylaminomethyl-o-proproxymethyl benzyl alcohol reveals the following:

(a) Acute toxicity determinations, made in accordance with standard pharmacological test procedures, reveal in the mouse an oral $LD_{50}$ of 620 mg./kg. and an intraperitoneal $LD_{50}$ of 200 mg./kg., and in the rat an oral $LD_{50}$ of >900 mg./kg. and an intraperitoneal $LD_{50}$ of 100 mg./kg.

(b) Using a procedure essentially as described by P. B. Dews, Brit. J. Pharmacol. 8:46 (1953), the compound decreases spontaneous locomotor activity by about 50 percent when administered to mice at dose of from 5 to 100 mg./kg. intraperitoneally and from 25 to 100 mg./kg. orally.

(c) Following the method of Lasagna and McCann, Science 125:1241 (1957), the compound provided protection against amphetamine toxicity in mice at oral doses of from $\frac{1}{10}$ to $\frac{1}{2}$ of the intraperitoneal $LD_{50}$ that is quantitatively superior to that obtained in the same test with comparable doses of the known central nervous system depressants 7-chloro-1,3-dihydro-1-methyl-5-phenyl-2H-1,4-benzodiazepin-2-one (diazepam) and 2-methyl-2-propyl-1,3-propanediol dicarbamate (meprobamate).

(d) Administration to mice pretreated with an anesthetic dose of hexobarbital produces a prolongation of sleeping time at doses of 20 and 40 mg./kg. intraperitoneally that is quantitatively equivalent to that obtained in the same test with comparable doses of the known central nervous system depressant 2-chloro-10-(3-dimethylaminopropyl)phenothiazine (chlorpromazine).

The following example is illustrative of the preparation of other tangible embodiments of this invention.

EXAMPLE 2

α-Dimethylaminomethyl-o-methoxymethyl benzyl alcohol

By the same procedure described in Example 1, α-dimethylaminomethyl-o-xylene-α,α'-diol (23 g., 0.1 mole) is treated with methanol (250 ml.) containing an excess of hydrogen chloride in a bomb that is heated at 100° C. for 20 hours. The crude product is distilled to yield 7 g. (25%) of the free base, B.P. 125°–135° C. at 0.25 mm. Hg.

*Analysis.*—Calculated for $C_{12}H_{19}NO_2$: C, 68.67%; H, 9.15%; N, 6.69%; O, 15.29%. Found: C, 68.17%; H, 9.10%; N, 6.81%; O, 14.91%.

The subject matter which the applicant regards as his invention is particularly pointed out and distinctly claimed as follows:

1. α-Di-lower alkylaminomethyl-o-lower alkoxymethyl-benzyl alcohol.

2. α-Dimethylaminomethyl-o-propoxymethyl benzyl alcohol.

3. α-Dimethylaminomethyl-o-methoxymethyl benzyl alcohol.

References Cited

UNITED STATES PATENTS 3,284,468   11/1966   Keller _____ 260—570.6 X

ROBERT V. HINES, Primary Examiner

U.S. Cl. X.R.

260—247.7, 268, 294.7, 326.5, 501.17, 567.6; 424—248, 250, 267, 274, 329, 330